(12) United States Patent
Spoetzl

(10) Patent No.: US 6,238,200 B1
(45) Date of Patent: May 29, 2001

(54) SIZING DEVICE FOR PLASTIC BLOW MOLDING MACHINES

(76) Inventor: Markus Spoetzl, Alläuer Strasse 103, D-81475, München (DE)

( * ) Notice: Subject to any disclaimer, the term of this patent is extended or adjusted under 35 U.S.C. 154(b) by 0 days.

(21) Appl. No.: 09/239,513

(22) Filed: Jan. 29, 1999

(30) Foreign Application Priority Data

Oct. 9, 1998 (DE) .............................................. 198 46 594

(51) Int. Cl.[7] ............................. B29C 49/50; B29C 49/58

(52) U.S. Cl. ......................... 425/525; 264/533; 425/531; 425/535

(58) Field of Search ..................................... 425/535, 525, 425/531; 264/533

(56) References Cited

U.S. PATENT DOCUMENTS 4,871,492 * 10/1989 Spoetzl .................. 425/535

FOREIGN PATENT DOCUMENTS 0 265 713 A2 * 5/1988 (EP) ..................................... 425/535

* cited by examiner

*Primary Examiner*—Robert Davis
(74) *Attorney, Agent, or Firm*—Fulbright & Jaworski, L.L.P.

(57) ABSTRACT

A sizing device adapted for automatic blow mandril adjustment for plastic blow molding machines is provided with at least blow mandril having a blow nozzle and a cutting edge and forming a module with a blow mandrel carrier. The blow mandril is guided in a guide plane extending perpendicularly to the axis of the blow mandril for adjustment in relation to a module carrier suitable for connection with the blow molding machine in the axial and any desired radial direction and in both directions is respectively able to be locked by means of a respective setting means on the blow mandril carrier adapted to be connected with the module carrier. The blow mandril is urged in relation to the module carrier axially toward the blow nozzle into the home position and is able to be moved in the opposite direction overriding the biasing action as far as engagement with the blow mandrel carrier. The setting means for locking the at least one blow mandril in position are able to be operated by means of pressure medium.

23 Claims, 5 Drawing Sheets

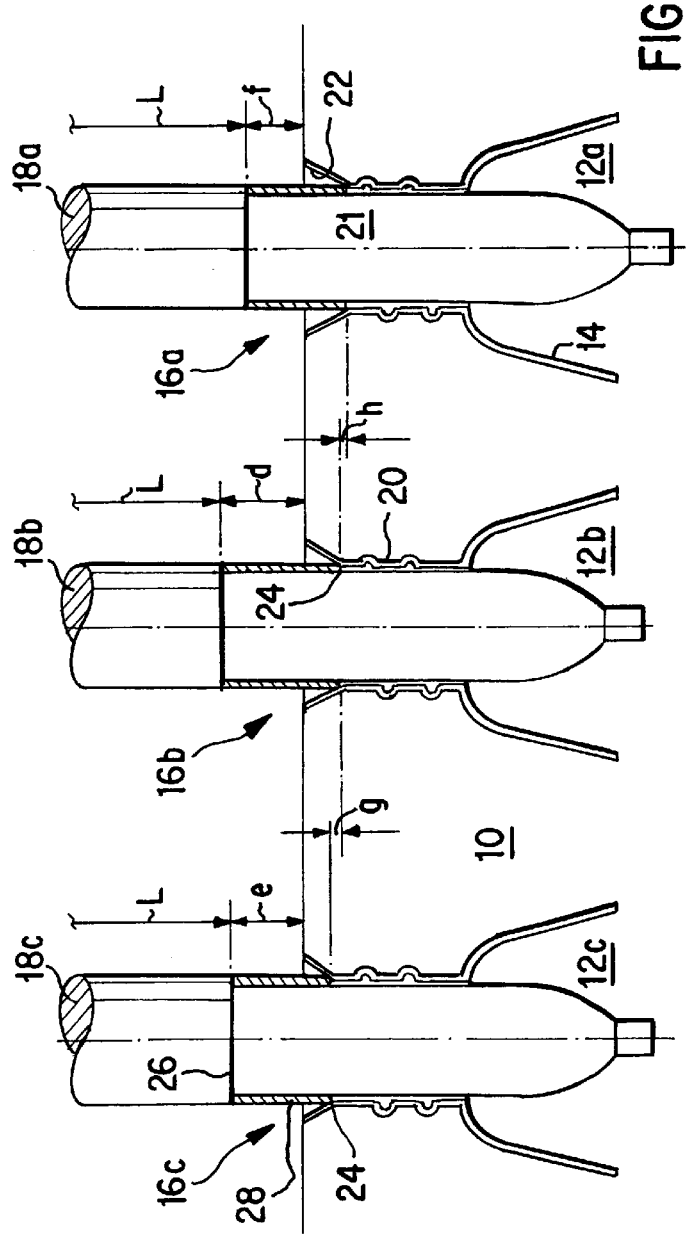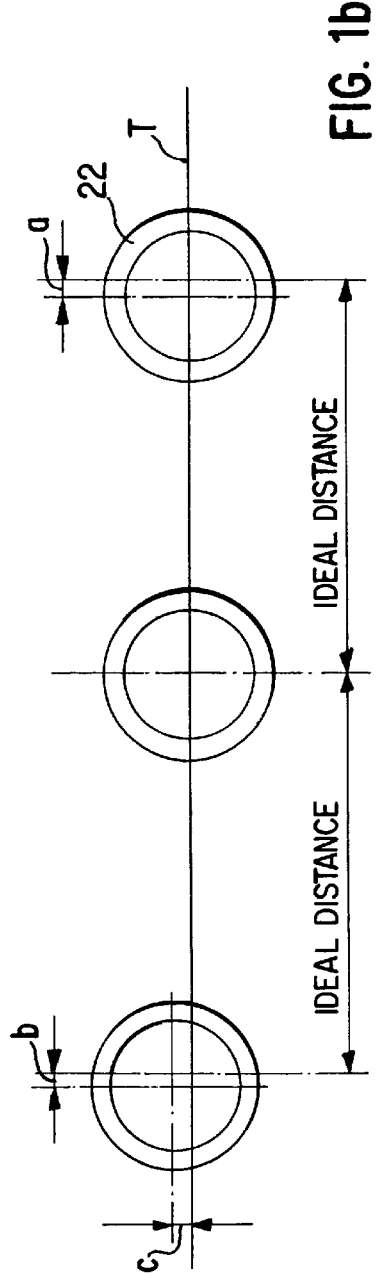

SIZING DEVICE FOR PLASTIC BLOW MOLDING MACHINES

BACKGROUND OF THE INVENTION

1. Field of the Invention

The present invention relates to sizing devices. More particularly, the invention relates to a sizing device, adapted for automatic blow mandril adjustment for plastic blow molding machines. A sizing device accordingly to the invention is provided with at least one blow mandril having a cutting edge and a blow nozzle. Said blow mandril may be adjustably guided and borne by a blow mandril carrier, while being lockable in a selected position by at least one setting means. The blow mandril may be axially biased in relation to the blow mandril carrier toward the blow nozzle to a home position and may be able to be moved in an opposite direction until the bias is overcome and the blow mandril bears against the blow mandril carrier.

Herein the term "sizing device" will be understood to mean that unit of a plastic blow mandril machine, which is provided with at least one blow mandril which is moveable relative to a blow mold in order to introduce the blow mandril into a blow opening therefor and to withdraw the same from a mold after a blowing operation. Such blow mandrils may be matched to the configuration of the blown bodies to be produced and may be connected to the sizing device in an exchangeable manner. The position of the blow mandrils on the sizing device may also be capable of being varied. In order for the blow mandrils to be set in an ideal position, the blow mandrils may be arranged in an adjustable manner in a blow mandril carrier.

For the adjustment of blow mandrils, a reciprocating movement of the sizing device is necessary. In the case of a sizing means, which preferably automatically self-centers itself, as disclosed in the German patent publication 3,623,099 C3, a single downward stroke of the sizing device is all that is required. Using this design, it is possible to automatically to set the horizontal and also the vertical position of the blow mandrils at the ideal position with a single working stroke of the sizing device in which case, each blow mandril is aligned coaxially to a conically widening blow opening of the blow mold and a cut, effective over the entire periphery of the cutting edge, in cooperation with the conical face of the blow opening is ensured. After the blow mandrils have been ideally positioned, the ideal position may be locked by manual actuation of clamping means on the sizing device.

2. Description of the Related Technology

In the case of blow molding machines there is a rule of operation to the effect that on overriding a guard means preventing access to the moving parts of the machine, the hydraulic system powering such moving parts is set at zero pressure to prevent any danger to any person putting his hand or his whole body in the way of such moving parts.

For adjustment, it is necessary for the blow mandrils borne on a blow mandril carrier to be unlocked for axial and radial movement in relation to the blow mandril carrier and then after reaching the ideal position to be re-locked in relation to the blow mandril carrier. Since the adjustment operation requires at least one stroke of the sizing device, the guard means must be closed for the hydraulic system to be able to operate. The setting means serving for locking the ideal position of the blow mandril, and which is normally provided with clamping screws, has for example been operated using wrenches with elongated shanks which extend through the guard or, if there was enough room, the setting means was made accessible via a bridge extending above the sizing device. In any case it is necessary to reach into the danger area of the blow machine for which purpose protective grilles, or the like, must be opened or removed and then later moved back into the intended position. Furthermore, ready access must be provided to the actuating means of the clamping device. This is not always free of problems and may conflict with other design criteria, meaning that the actuation of the clamping device may require a certain degree of skill or the use of special-purpose tools.

Consequently, both for reasons of safety and for speed of operations, there is a requirement of designing a plastic blow molding machine of the type described in which no access to the working or danger area of the machine is necessary for the actuation of the setting means.

Technical development has meant that more productive sizing devices are called for. These so-called multiple sizing devices are fitted with a large number of blow mandrils. Each of the blow mandrils must be individually adjusted. Even if automatic adjustment is employed, by means of which all blow mandrils of the multiple sizing system are to be brought into their ideal working position by a single downward working stroke of the sizing device, the adjustment operations required for multiple sizing are slow and expensive because individual actuation of the setting means of each blow mandril is required. release of the blow mandrils before the adjustment stroke and the re-locking of each blow mandril after the adjustment stroke. The process is even slower and more expensive if the previously mentioned hindrances to working are taken into account.

Since it is possible in modem production technology to ensure the position of blow mandrils within a multiple sizing operation with a high degree of accuracy, there has already been a proposal to set the position of the blow mandrils within a multiple sizing system exactly in accordance with the distance between the blow openings on the associated blow molding tool and to install the blow mandrils at radially fixed distances apart in the multiple sizing system. This leads to difficulties despite the use of materials with exactly the same coefficients of thermal expansion and the use of the same blow molding tool. During operation different temperature settings move occur between the blow molding tool on the one hand and the multiple sizing system on the other hand such that the exact alignment of the blow mandrils and the blow openings cannot be ensured. This may result in increased cutting edge wear. If, with a minimum amount of design modification, the radial adjustment of the blow mandrils may be optimized at any time in accordance with respectively occurring thermal conditions then this source of cutting edge wear may be excluded. However, for this to work it is necessary to abandon the use of blow mandrils with a fixed radial distance.

Preferably, together with its carrier, each blow mandril constitutes a replaceable unit called a "module". In addition, those regions of the sizing device at which such units are attached and are able to be changed in position relative to the blow mandrils are called the "module carriers" of the sizing device.

SUMMARY OF THE INVENTION

In view of these problems, one object of the invention is to provide a sizing device of the type described above in which the adjustment and locking of blow mandrils in the ideal position may be performed from a control unit positioned outside the danger zone and employed in a manner advantageous from the point of view of safety and convenience. The advantages of automatic adjustment, that is to say a substantial saving in time and ease of operation, being present even in the case of multiple sizing.

In order to achieve this object in the case of a sizing device of the type initially mentioned there is provided at least one setting means for locking at least one blow mandril which may be actuated by fluid pressure. In a first embodiment of the invention, the setting means has clamping faces able to be braced against each other.

Because some functions of plastic blow molding machines, i.e., the actuation of the mold closing unit, take place by hydraulic pressure, such machines are fitted with means which make hydraulic pressure available. In addition, gas under pressure is often available for the blowing operation. Accordingly, only a relatively minor design modification is required in order for the setting means on the sizing device to be supplied from a control console. For example, via a control valve and a supply line with pressure, and if necessary to set such pressure to the optimum value for such actuation.

If the sizing device is provided with more than one blow mandril, it is necessary to assume that during the blowing stroke of the sizing unit not all the cutting edges of all blow mandrils will strike the conical faces of the blow openings simultaneously. Accordingly, one convenient feature of the invention is that in the case of sizing devices with more than one blow mandril, each blow mandril is mounted moveable in an axial direction between a home position and an end position in a guide sleeve and is biased toward its blow mandril into such home position. The distance between the home position and the end position may be selected that it exceeds the maximum distance apart, measured in the direction parallel to the axis, of the design-permitted positions of the cutting edges in the home position. The guide sleeve may be guided together with the blow mandril on the sizing device in the guide plane in any desired direction in relation to the base and may be locked.

During the adjustment stroke, as the sizing device approaches the blow mold, the cutting edge of a first blow mandril strikes the conical face of the blow opening and the sizing device moves further downward. Such first blow mandril will be displaced from its home position toward its end position until it comes to rest in its end position and the adjustment stroke is completed. This movement of the sizing device between striking the first cutting edge and the end of the adjustment stroke is sufficient to move the cutting edges of the remaining blow mandril up to the conical areas associated with them. Such blow mandrils move along different axial paths in their guide sleeves in accordance with their respective departures from the ideal position, without reaching the end position.

Preferably, the home position and the end position are defined by mutually associated abutments on the blow mandril and the guide sleeve.

Because the automatic centering of the blow mandril transfers the blow mandrils into an ideal position (in which the blow mandril axis and the blow opening axis are completely aligned), introduction of the blow mandrils into the blow openings is not by transverse forces on the blow mandril.

Conventional manual adjustment of blow mandrils involved optimization in steps, that is to say by a number of test strokes of the sizing device each with subsequent adjustment of the blow mandril in accordance with the departure found from the ideal position. It was only possible to achieve a rough approximation of the ideal position, which meant that after the first contact, usually at a single point of the cutting edge with the conical opening facing the blow opening located on the mold, the blow mandrils were thrust during the further downward motion by more or less heavy lateral forces accompanied by corresponding elastic deformation of the blow mandril into the ideal position, in which the cutting edge was in contact along its complete periphery with the conical face in order to perform a clean cut and avoid waste.

For reasons of convenience of assembly it is advantageous for each blow mandril to extend through the guide sleeve associated with it and project from the guide sleeve remote of the blow nozzle in order to connect with supply lines, which serve to supply the blow mandril with compressed air and coolant.

In order to lock the blow mandril in the axial direction, the guide face of the guide sleeve may be at least partially the inner face of a collet adapted to be actuated by fluid pressure and which may be selectively acted upon by such pressure. A preferred embodiment is such that at its end remote from the blow nozzle, the guide sleeve possesses a section with an increased internal diameter into which the clamping section of a hydraulic collet is inserted. The end section may rest on the end face turned toward it and may be connected thereto. The end section may also be provided with a fluid connection for a pressure chamber formed in the interior of the clamping section.

In the case of sizing devices with a fair number of blow mandrils, such as 8 or 10 blow mandrils, it is impossible to exclude the possibility of a displacement under load of the relatively long module carrier. This may lead to slight sagging or buckling taking place, meaning that the cutting edges of the central blow mandrils are some hundredths of a millimeter lower down than the cutting edges of the outer blow mandrils. Accordingly, they may not correctly engage the associated conical faces of the blow openings of the blow molds. Even these slight inaccuracies may have an undesired effect on separating the neck bleb and result in waste. If vertical motion of the blow mandrils in the guide sleeve is not prevented by locking means, such lack of accuracy might be compensated for automatically. However, if the blow mandrils are fixed in the axial direction, an additional possibility for adjustment to compensate for such inaccuracy must be provided. Therefore, in accordance with another aspect of the invention there is provided an intermediate sleeve positioned between the blow mandril and the guide sleeve wherein between the intermediate sleeve and the blow mandril there may be a slight degree of axial play. This may be due to an abutment on the blow mandril resting against the intermediate sleeve with a bias directed toward the blow nozzle. The blow mandril may be biased into its home position by a spring acting between the guide sleeve and the intermediate sleeve and the bias between the blow mandril and the intermediate sleeve may be greater than the bias between the guide sleeve and the intermediate sleeve. If so, there is no effect on the above mentioned automatic axially directed adjustment of the blow mandrils before locking, while nevertheless there is the possibility of compensation for inaccuracies caused by load forces acting on the module carrier.

For radial locking of the position of the blow mandrils in accordance with a further embodiment, the guide sleeve with the blow mandril is borne on a blow mandril carrier arranged on the base of the sizing device. In the carrier, the guide sleeve may be mounted for movement in a guide plane. The guide sleeve may be provided with an annular flange, whose bottom face, which is parallel to the guide plane and is turned toward the blow nozzle of the blow mandril, bears against a washer. For its part, an intermediate support spring bears on a shoulder formed on the blow mandril carrier, and the lower side of the flange faces the end face of an annular piston guided for motion parallel to the axis of the blow mandril. The side facing away from the flange of such piston helps define a pressure chamber, which is formed in the blow mandril carrier. Such pressure chamber may be capable of being charged with fluid under pressure.

In accordance with a further aspect of the invention there is provided an annular space between the annular piston and the guide sleeve. Disposed in the annular space is a compression spring, which at one end, in the direction away from the blow nozzle, bears against the guide sleeve and in the opposite direction bears against a shoulder associated with the blow mandril. Such shoulder may be arranged on the blow mandril or, in the case of an embodiment with an intermediate sleeve, on the intermediate sleeve.

When the clamping faces of the setting means are held by a pressure medium in their clamping position, it is possible for the adjustment of the blow mandrils to depart from the ideal position accidentally as soon as the blow molding machine is halted. The blow molding machine pressure must be turned off for any operation in the danger area. If it is to be reliably ensured that the locking of the blow mandrils in their exact working position is to remain unaffected even for operations in the danger area where the safety guard is to be opened and the pressure in the hydraulic system turned off, a centrally controlled locking of the blow mandrils, caused by fluid pressure, is not a possible solution to the technical problem, because it does not fulfil the last named condition.

Therefore a particularly advantageous design of the invention provides at least one setting means for locking at least one blow mandril biasly against its associated blow mandril carrier. This may be accomplished by at least one spring urging it into its locked position and wherein it may also be acted upon by a pressure medium urging it into its released position.

On opening the safety guard, the pressure medium is always switched off so that for operations in the danger area the blow mandrils remain fixed in position by the force of the spring or springs and accordingly accidental loss of adjustment is out of the question.

In accordance with a further advantageous embodiment there is provided a collet-like region formed on the guide sleeve, in which region at least one clamping element, which is suitable for exerting a radially directed inward force, is biased by spring force into an effective locking position and by the pressure medium may be transferred into its released position. In accordance with a preferred embodiment, one section of the collet-like region may be divided up by at least one longitudinal slot and may have a conical external face, surrounded by an annular piston with a complementary conical internal face biased by spring force into a position urging the divided section into the locking position.

Preferably the guide sleeve comprises two sections, namely a guide section, which has the internal face serving for axial guidance of the blow mandril and the at least one clamping element, and a second hood-like section fitting around the guide section from the outside. The hood-like section surrounds an annular chamber at a radial distance from the external face of the guide section. In the annular chamber the annular piston is arranged. In this respect on, the first section an annular shoulder delimiting the annular chamber is formed, and a seal is provided for the annular end face of the annular piston opposite to the annular shoulder. The part located between the annular shoulder and the annular piston of the annular chamber may be acted upon as a pressure chamber via a duct capable of employing pressure medium.

A still further embodiment is such that on the side facing away from the pressure chamber, a compression spring is fitted between the annular piston and the end wall of the second section of the guide sleeve. Said compression spring may be capable of urging the annular piston into its fixed position, and the compression spring is preferably a belleville washer for reducing the overall size.

A particularly appropriate design is one in which the guide sleeve together with the blow mandril is borne by a blow mandril carrier arranged on the module carrier. The blow mandril in the guide sleeve is mounted in the guide plane in a moving manner. The guide sleeve is provided with an annular flange whose lower side, parallel to the guide plane and facing the blow nozzle of the blow mandril, bears on a sliding washer whose other side bears a piston. A first compression spring may be held between the piston and the blow mandril carrier such that the piston is urged against the annular flange. The piston is able to be urged by a pressure medium in a direction opposing the force of this first compression spring. The sliding washer may be urged by means of a second compression spring, which is weaker than the first compression spring, against a shoulder formed on the blow mandril carrier.

It is more advantageous for the assembly and adaptation of plastic blow molding machines having sizing devices in accordance with the invention if the blow mandril together with the blow mandril carrier constitutes a module. The blow mandril should be able to be adjusted in a guide plane extending perpendicularly to the axis of the blow mandril in relation to a module carrier suitable for combination with the blow molding machine in any axial and any desired radial direction. Once a desired position is reached, the apparatus is capable of being locked by means of a respective setting means and is guided on the blow mandril carrier which is able to be connected with the module carrier. The blow mandril may be biased relative to the module carrier axially toward the blow nozzle into the home position.

Further advantageous developments and convenient forms of the invention will be understood from the following detailed descriptive disclosure of embodiments thereof in conjunction with the accompanying drawings.

LIST OF THE SEVERAL VIEWS OF THE FIGURES

FIG. 1a is a diagrammatic vertical view taken through the blow openings of a blow mold having three blow openings, the blow mandril shown in the blow position.

FIG. 1b is a plan view looking down on the blow mold which has the three blow openings.

Figure 2:
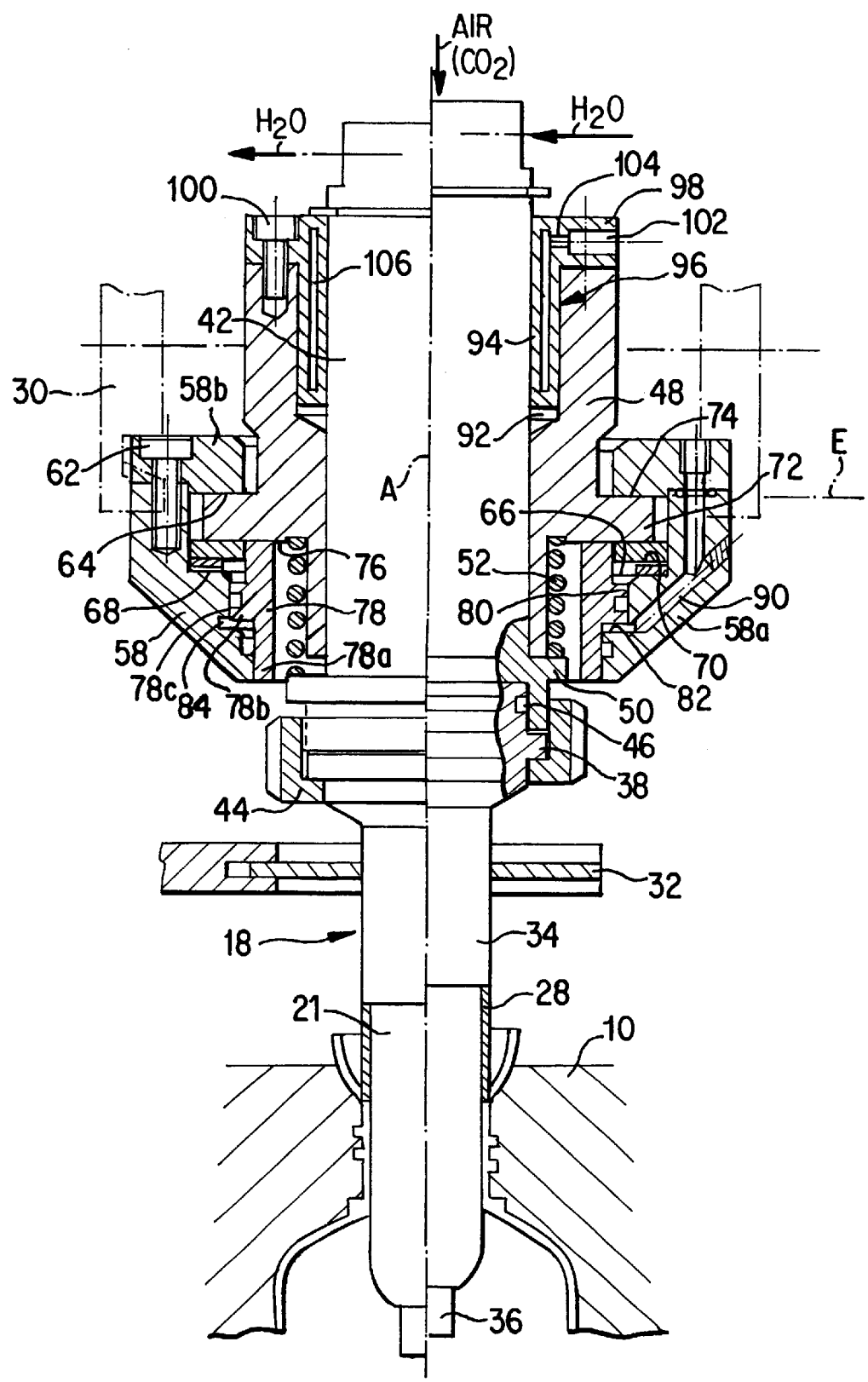

FIG. 2 is a vertical section taken through a module of a sizing device designed in accordance with the invention in a blow position, said sizing device being connected with a diagrammatically illustrated module carrier, functionally adjacent to the blow mandril axis and in the blow position. The left hand and the right hand half show the two possible axial extreme positions of the blow mandril carrier (without the blow mandril being axially secured). The left hand half shows the cutting sleeve having been foreshortened relative to the blow mandril carrier by repeated grinding of the cutting edge to be shorter than the cutting sleeve depicted in the right hand half.

Figure 3:
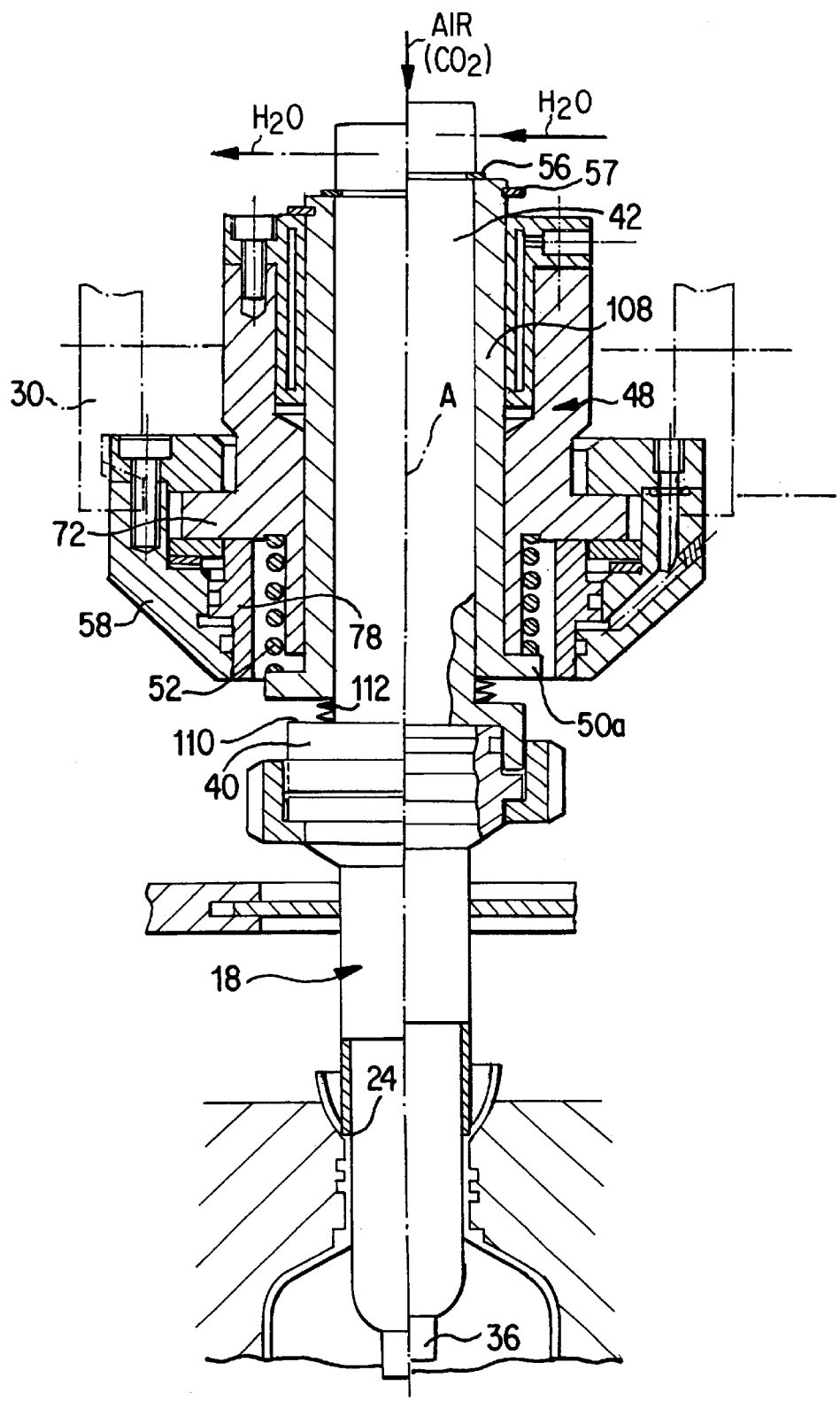

FIG. 3 shows a vertical section, similar to that of FIG. 2, taken through a first possible modification of the sizing device.

Figure 4:
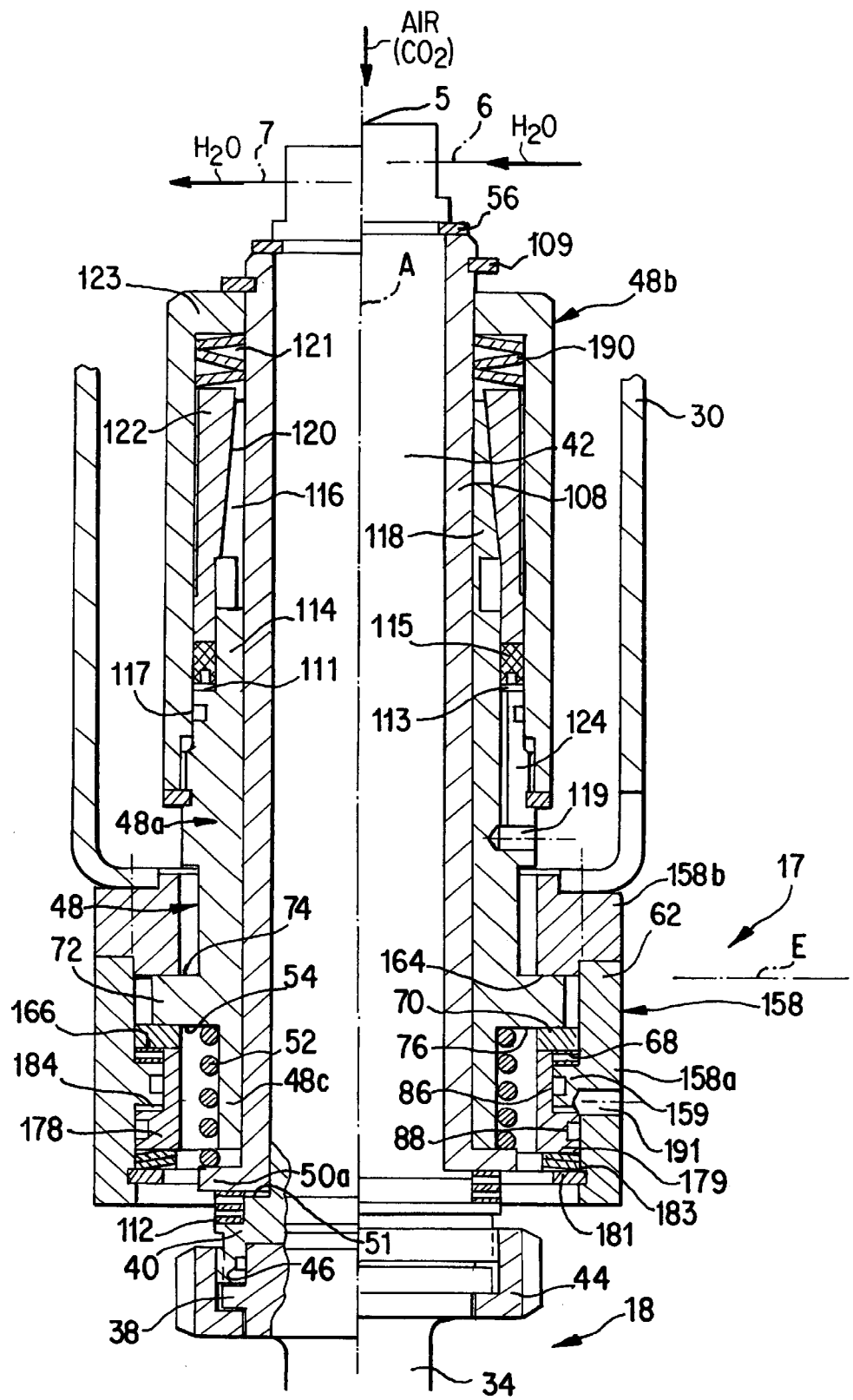

FIG. 4 shows a view, also sectioned at the axis of the blow mandril, of the top region of a module of a further possible modification of a sizing device designed in accordance with the invention, of which the locking of the blow mandril is able to be overridden by pressure medium.

Figure 5:
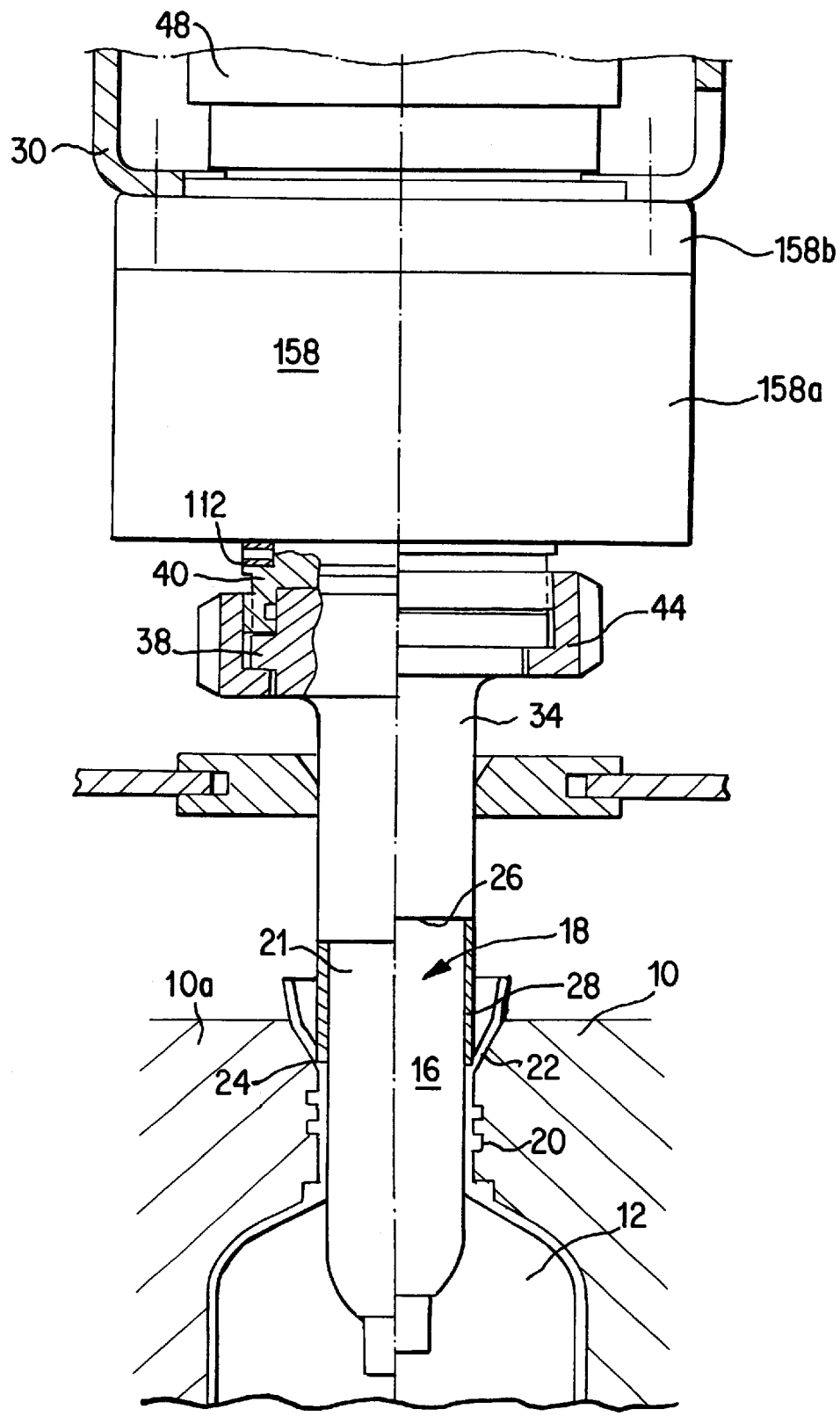

FIG. 5 is a view complementary to that of FIG. 4 showing the lower region of the module together with a part of the blow mold.

DETAILED DESCRIPTION OF THE PREFERRED EMBODIMENT

Referring to FIGS. 1A and 1B, the problem which exists in connection with adjustment of the blow mandrils of sizing devices with several blow openings will be described.

In FIG. 1B the line T indicates the vertical parting plane of a split blow mold having mold halves 10a and 10b and having three mold sets 12a, 12b and 12c (FIG. 1A) for blowing identically formed hollow bodies, in the present example, bottles 14. Blow molding machines operate in strokes with a set, repeated in each working stroke, of steps. These working steps are known to those skilled in the art and consequently will not be described in full detail but rather only to the extent that they are of interest in connection with the adjustment of the blow mandrils.

At the beginning of the stroke the mold is so opened that the mold halves are not at a horizontal distance apart. An extrusion nozzle is associated with each mold set, and from such extrusion nozzle a tube of plastic material in a plastic state emerges. When the tubes have the necessary length, the mold closes. The tube section in the mold is severed off from further tube emerging from the nozzle and the mold is moved into a blow position, wherein a respective blow mandril 18a, 18b and 18c is inserted downward through the blow openings 16a, 16b and 16c. The blow openings 16a, 16b and 16c serve for the formation of the bottle neck 20, each blow mandril generally referenced 18 having a cylindrical section 21 serving for sizing the bottle neck.

The blow openings generally referenced 16 become wider at their top end in a conical section 22. A cutting edge 24 formed on the blow mandril 18—such cutting edge in the present case being formed on the bottom edge of a cutting sleeve 28 slipped onto the cylindrical section 21 of the blow mandril 18 as far as an abutment constituted by a shoulder 26—cooperates with the face of the conical section 22 in order to sever off the remainder, not required for the formation of the hollow body, the so-called neck bleb, of the tube.

In the position depicted in FIG. 1b the center of the blow opening 16 is exactly in the mold parting plane T. The other blow openings should theoretically also be located exactly in the mold parting plane T and have the same distances between them in the mold parting plane T, such distances being denoted as the "ideal distance" in the drawing. In practice slight departures from this ideal distance may not be avoided without undue design complexity, as is indicated in FIG. 1b in an exaggerated fashion. Thus the distance of the blow opening 16a from the adjacent blow opening 16b is less than the ideal distance by the amount a, but however the blow opening 16a is still in the mold parting plane T. The distance of the blow opening 16c from the blow opening 16b is greater than the ideal distance by the amount b, and furthermore the blow opening 16c is offset out of the mold parting plane by the distance c. In an equivalent manner, such departures from the ideal position may also occur in the case of the blow mandrils 18a through 18c carried by the module carrier 30 of the sizing device. Since a reliable cutting action of the cutting edge may only occur when the cutting edge is exactly coaxial to the blow opening 16 and accordingly the entire periphery of the cutting edge 24 comes into engagement with the wall face of the conical section 22, it is necessary on mold changing for the blow mandrils to be adjusted in the two horizontal coordinate directions in relation to the blow openings of the mold and then locked in that position.

Since the cutting edges 24 of all blow mandrils 18 are subject to wear on the cutting sleeves, they must be reground from time to time. Therefore the position of the blow mandrils is able to be adjusted in the axial direction.

The shoulder 26 divides the cylindrical section 20 of the blow mandril into two sections with different diameters. The top, thicker section extends through a stripper 32 which is stationary in relation to the sizing device carrying blow mandrils 18 through 18c. The stripper is adapted to strip off the neck blebs from the blow mandril 18 when the sizing device moves upward after opening the blow mold 10.

The blow mandril 18 comprises two parts, namely: (1) a blow and sizing part 34, which at its bottom end has a blow nozzle 36 and then merges into a cylindrical section 21; and (2) a blow mandril shank 42. The blow and sizing part 34, is adapted in its configuration to match the respective molded body to be produced and possesses a connection end 38, which may be introduced in a sleeve like end 40 of the blow mandril shank 42 and capable of being clamped in place by means of a union nut 44, creating a seal 46 rendering the connection fluid-tight.

The blow mandril shank 42 is guided for axial motion in a guide sleeve 48 as depicted in the right hand half of FIG. 2. In the end position of the blow mandril 18 is a collar 50, formed on the blow mandril shank 42, is in engagement with the end facing the blow nozzle 34 of the guide sleeve 48 so that a vertically directed movement of the blow mandril 18 within the guide sleeve 48 is prevented. Against this collar 50 there bears a helical compression spring 52, which surrounds an end section 48a of the guide sleeve 48 with a reduced external diameter and whose other end bears against a shoulder 54 formed on the guide sleeve 48. The helical compression spring 52 tends to draw the blow mandril downward out of the guide sleeve 48, but is prevented from doing so by an abutment ring 56. The ring 56 cooperates with the opposite end of the guide sleeve 48, is inserted into the blow mandril shank 42, and terminates the motion of the blow mandril 18 within the guide sleeve 48 in a home position as depicted in the left hand half of FIG. 2. In this home position, the blow mandril 18 approaches the blow opening 16 of the blow mold 10 when a blow stroke is performed by the sizing device in a downward direction.

The guide sleeve 48 is received in a blow mandril carrier 58 which is connected with the diagrammatically indicated module carrier of the sizing device. This blow mandril carrier 58 surrounds the guide sleeve 48 together with the blow mandril 18 extending therethrough. The mandril carrier comprises a generally shell-like bottom part 58a and a cover 58b thereon, such cover being attached by screws 62 to the bottom part 58a. The cover has a bottom side 64 extending perpendicularly to the axis A of the blow mandril, such bottom side defining a guide plane E for the guide sleeve 48. At a vertical distance from this guide plane E a shoulder 66 is formed which is parallel to this guide plane E, on which shoulder 66 a spring with a low overall height, as for example a corrugated spring washer, rests, which supports an annular washer 70.

The guide sleeve 48 is provided with a radially outwardly extending flange 72, which has a top side 74 parallel to the guide plane E and a bottom side 76 also parallel thereto. The top side 74 is opposite to the bottom side 64 of the cover 58b and the bottom side 76 of the flange 72 is on the washer 70 so that the flange 72 is held by the action of the spring 68 in engagement with the bottom side 64 of the cover 58b without the force of the spring 68 being sufficient to obstruct sliding of the flange 72 and accordingly of the guide sleeve 48 in the guide plane E. The force of the spring 58 is however sufficient to prevent skewing of the blow mandril 18 (i.e., a change in angle of the blow mandril axis A in the course of the adjustment motion in the guide plane E).

Between the helical compression spring 52 and the blow mandril carrier 58 there is such a large radial distance that an annular piston 78 may be arranged therein, such piston comprising a sleeve-like guide part 78a and a collar-like piston part 78b radially projecting from the same. The cylindrical peripheral face 78c of the piston part 78b is in engagement with a cylindrical internal face 80, which extends downward from the internal edge of the shoulder 66 and terminates at a further radially inwardly projecting shoulder 82, which forms a wall section of a pressure chamber 84, such wall part being opposite to the piston part 78b, such pressure chamber being delimited in a radially outward direction by the internal face 80 and radially inward by the external face of the guide part 78a. For sealing the pressure chamber 84 there are provided seals 86 and 88. The pressure chamber 84 may be supplied with a pressure medium via a duct 90 with the result that the top side 74 of the flange 72 is urged against the bottom side 64 of the cover 58b and displacement of the guide sleeve 48 in the guide plane E is prevented by a clamping action.

When after a modification of the system; (namely, a change of the blow mold, replacement of the blow mandrils, or sharpening of the cutting sleeves), the sizing device is moved downward for adjustment of the blow mandril or, of the blow mandrils 18, and the pressure chamber 84 will be free of pressure. When the cutting edge 24 strikes the conical section 22 eccentrically, then on further movement of the downward motion the blow mandril axis will be moved into a position coaxial to the blow opening 16. After this the downward movement will be continued until the blow mandril or, in the case of several blow mandrils, the first blow mandril to reach the conical section 22, reaches its end position and further downward movement is not possible. The pressure chamber 84 is then put under pressure, the position of the blow mandril is locked in the adjustment plane E, and production may commence.

For setting the blow mandril in position in the direction of the blow mandril axis A on the end, which is remote from the blow nozzle 36 of the guide sleeve 48, there is a section 92 with an increased internal diameter into which the clamping section 94 of a hydraulic collet 96 fits, whose internal diameter is the same as the internal diameter of the guide sleeve 48. The Collet's 96 flange-like end section 98, which has a larger external diameter, engages the end face of the guide sleeve 48 and is attached to the same by means of screws 100. A lateral hydraulic connection 102 is attached via a duct 104 in communication with the pressure chamber 106 in the clamping section. When the blow mandril 18 has been set to the ideal position, it is possible to set the blow mandril 18 in position by putting the pressure chamber 106 under pressure.

As already mentioned, in the case of sizing devices with a large number of blow mandrils, a load-induced displacement of the module carrier 30 of the sizing device may occur. The result is that the cutting edges 24 of the blow mandrils 18 will have slight differences in level (as considered in the direction of the blow mandrils A). Such differences in level are likely to impair the cutting operation. To ensure that differences in level may be compensated for (even in the case of axially locked blow mandrils 18 as in the embodiment of FIG. 3) the blow mandril shank 42 is surrounded by an intermediate sleeve 108 on whose end, remote from the blow mandril 36, a flange-like collar 50a is provided, which replaces the collar 50 provided in the embodiment of the invention of FIG. 2 on the blow mandril 18, and accordingly serves as a counter-abutment for the helical compression spring 52. Between the collar 50a and an end face 110(, facing it and extending radially), of the sleeve-like end 40 of the blow mandril shank 42 there is a small axial distance which is sufficient for the intended compensation in level. Such distance is being bridged by a compression spring 112. The force of this spring 112 is larger than the force of the helical compression spring 52 thereby allowing the blow mandril 18 and the intermediate sleeve 108 to move jointly as long as the blow mandril 18 is not locked. To this extent, it is possible for the intermediate sleeve to be regarded as a part of the blow mandril 18 for purposes of the axial guidance of the blow mandril 18 between the home and end positions.

In FIG. 5, reference numerals 10 and 10a again denote the two mold halves of a blow mold divided by a vertical parting plane with several mold sets arranged in an axially parallel manner to one another for the blowing of identically shaped hollow bodies 12. Details which correspond to each other are denoted by the same reference numerals as in FIGS. 2 and 3.

The sizing device is provided with a module carrier able to be raised and lowered and on which exchangeable modules generally referenced 17 are attached. Each module is part of one of the mold sets 12 and is provided with a blow mandril 18 suitably adapted for the production of hollow bodies.

Attached to a top end, remote from the blow nozzle 36, of the blow mandril shank 42, there is a compressed air supply duct 5, a coolant supply duct 6, and a coolant return duct 7.

The blow mandril shank 42 is surrounded by an intermediate sleeve 108, provided for the above mentioned reason, on whose end remote from the blow nozzle 36 the blow mandril shank 42 bears by the intermediary of an abutment ring thereon. At the other end of the intermediate sleeve 108 a radially outwardly projecting collar 50a is formed, which by way of a compression spring 112 so bears against of the sleeve-like end 40 of the blow mandril shank 42 that there is a small amount of axial play between the intermediate sleeve 108 and the blow mandril shank 42, which play may be taken by compression of the flat wire compression spring 112, following which the collar 50a then bears against an annular shoulder 51 on the blow mandril shank.

Together with the blow mandril 18 surrounded by it the intermediate sleeve 108 runs axially in a two-part guide sleeve 48. The guide sleeve 48 comprises a guide section 48a surrounding the intermediate sleeve, the external face of the section 48a tapering conically is a part of its top end section 114 (which in reduced in diameter to form an annular shoulder 111) toward the end, said end section being divided like a collet by axially extending slots 116 into lugs 118, which are surrounded by an annular piston 122 having a conical internal face 120. This annular piston 122 and the end section 114 are encircled by a second hood-like section 48b of the guide sleeve 48, which section is so attached by a screw connection 124 on the guide section 48a that between the guide section 48a and the hood-like section 48b an annular chamber 121 is formed, wherein the annular piston 122 runs axially.

As depicted in the right to hand half of FIGS. 4 and 5, the end position of the blow mandril 18 has a collar in engagement with the end adjacent to the blow nozzle 34 of the guide sleeve 48. The result is that a vertically directed movement of the blow mandril 18 within the guide sleeve 48 is jammed or prevented. A helical compression spring 52 bears against the collar 50a. The first end of the compression spring surrounds an end section 48c of the guide part 48a with a reduced external diameter and the other end of the compression spring bears against a shoulder 54 formed on the guide part 48a. The helical compression spring 52 urges the intermediate sleeve 108, and with it the blow mandril 18, downward in relation to the guide sleeve 48. The motion is limited by an abutment ring 109 set in the intermediate sleeve 108. The abutment ring 109 cooperates with the end face, remote from the blow nozzle 36 of the guide sleeve 48, and terminates the motion of the blow mandril 18 within the guide sleeve 48 in a home position (as depicted in the left hand half of FIGS. 1 and 2). In the course of a downward blow stroke performed by the sizing device in this home position, the blow mandril 18 approaches the blow opening 16 of the blow mold 10 and 10a.

The guide sleeve 48 is received by a blow mandril carrier 158 connecting with a module carrier 30, which is only indicated diagrammatically. This blow mandril carrier 158 surrounds the guide sleeve 48 but allows the blow mandril 18 to extend therethrough. The carrier comprises an annular bottom part 158a and a cover 158b terminating at the top. The cover is connected at 62 by screws, not illustrated, to the bottom part 158a. The cover 158b possesses a bottom side 164 extending perpendicularly to the blow mandril axis A, such bottom side defining the guide plane E for the guide sleeve 48. At a vertical distance from this guide plane E, a shoulder 166 is formed on the bottom part 158a on a radially inwardly projecting collar 159. Said shoulder 166 faces the bottom side 164 and is parallel to the guide plane E and has a spring 68 with a low overall height resting on it, such spring for instance being in the form of a flat wire compression spring and bearing the washer 70.

The radial guidance of the flange 72 (and avoidance of skew running of the blow mandril 18) is ensured in the same fashion as for the modification of the invention illustrated in FIGS. 2 and 3.

Disposed between the helical compression spring 52 and the blow mandril carrier 158 is an annular piston 178. The piston 178 runs axially on the bottom part 158a, that is to say on the cylindrical internal face of the collar 159 and on the cylindrical internal face of the bottom part 158a underneath such collar 159, respective seal, 86 and, 88 are placed in each of said cylindrical internal faces. The top end of the annular piston 178 extends through the annular spring 68 and bears against the bottom side of the washer 70. Underneath the collar 159 the annular piston 178 for its part possesses a radially outwardly projecting collar 179 with the result that a pressure chamber 184 is formed between the mutually facing end ends of the collar 159 and of the collar 179. The chamber 184 is sealed off by seals 86 and 88 in pressure-tight fashion and may receive pressure medium via a duct 191.

Braced between the bottom side of the collar 179 and a lock washer 181 (set in the cylindrical internal face of the bottom part 158a) is a stiff belleville washer 183. The washer is adapted to thrust the annular piston 178 so powerfully upwardly that the flange 72 is firmly clamped between the cover 158b and the washer 70 so that it cannot move radially. Due to the action of the pressure in the pressure chamber 184, the annular piston 178 is thrust against the belleville washer 183 with the result that the clamping action on the flange 72 is overridden.

When the sizing device is moved downward for adjustment of the blow mandril, or blow mandrils 18, after a change in the system, (namely; a change of the blow mold, the replacement of the blow mandrils, or sharpening of the cutting sleeves), the pressure chamber 184 is put under pressure. If the cutting edge 24 strikes the conical section 22 eccentrically, then on continued downward motion the blow mandril axis will be displaced into a position coaxial to the neck opening 16. After this the downward motion is continued until the blow mandril or, in the case of several blow mandrils, the first one thereof, moving toward the conical section 22 reaches its end position and a further downward movement is no longer possible. The pressure is then let off from the pressure chamber 184 with the result that by means of the belleville washer 183 the position of the flange 72 and accordingly of the blow mandril 18 is set in the adjustment plane E.

In addition to setting the position of the blow mandril in the setting plane E, setting of the blow mandril position in the direction of the blow mandril axis A is also provided. This setting is also maintained by spring force and may be temporarily interrupted by pressure for this purpose. The end which projects past the end, remote from the blow aperture 36, of the guide part 48a of the annular piston 122 is loaded by a belleville washer 190. In the opposite direction the washer 190 bears against the end wall 123 of the hood-like part 48b of the guide sleeve 40. This indicates that the annular piston 122 is so slipped onto the end section 114 that the lugs 118 are urged radially inward, grip the blow mandril shank 42, and set it in the axial direction. The annular piston 122 ends at a distance from the annular shoulder 111 and an annular pressure chamber 113 is formed, in which a ring seal 115 bears against the annular end face of the annular piston 122. A further seal 117 is arranged between the pressure chamber 113 and the screw connection 124. The pressure chamber 113 can be put under pressure through a duct 119 so that the annular piston 122 is displaced under the action of the belleville washer 190 and the clamping action on the lugs 118 is overridden. Accordingly, the blow mandril shank 42 is free for axial adjustment. When the blow mandril 18 has reached its ideal position, it is possible for the blow mandril 18 to be set by letting off pressure medium from the chamber 113.

In order to avoid the previously mentioned harmful effects of deformation under the load of the module carrier 30, an intermediate sleeve 108 is placed between the blow mandril 18 and the guide sleeve 48. The such intermediate sleeve has a small amount of axial play between it and the blow mandril 18. The blow mandril 18 is urged by the spring 112 with the image ring and elastically biased against the blow nozzle and can bear against the intermediate sleeve 108. It is urged into its home position by the spring 52 clamped between the guide sleeve 48 and the intermediate sleeve 108, the biasing action between the blow mandril 18 and the intermediate sleeve 108 being greater than the biasing action between the guide sleeve 48 and the intermediate sleeve 108. It is in this manner that the above mentioned automatic adjustment of the blow mandrils 18 in the axial direction is not affected by the spring 112 prior to locking or setting, but means that there is a possibility of compensation inaccuracies caused by load forces on the module carrier.

What is claimed is:

1. A sizing device for blow molding machines comprising:
   a module carrier for attachment to a blow molding machine;
   a module disposed with said carrier, said module comprising a blow mandril carrier having an aperture therein and a blow mandril axially extending trough said aperture; said blow mandril defining a blow nozzle and a cutting edge; and
   a setting means for controlling at least the radial movement of said blow mandril relative to said blow mandril carrier;
   said setting means having a pressure chamber, said pressure chamber being actuatable by supplying a pressure medium to said pressure chamber.

2. The sizing device of claim 1 wherein said setting means further comprises:
   an annular guide sleeve disposed within said aperture of said blow mandril carrier, said guide sleeve having an outer surface capable of contacting at least a portion of an inner wall of said blow mandril carrier,
   an annular piston disposed between said guide sleeve and said blow mandril carrier, said annular piston having an outer wall,
   where said annular piston outer wall and said blow mandril inner wall define said pressure chamber and wherein said blow mandril extends axially trough said guide sleeve;
   whereby introduction of said pressure medium into said pressure chamber forces said guide sleeve into contact with said blow mandril carrier such that said blow mandril is prevented from radial movement.

3. The sizing device of claim 1 wherein said setting means further comprises:
   a compression spring adapted to bias said blow mandril in a radially locked position,
   wherein introducing said pressure medium into said pressure chamber is capable of overcoming the spring bias, thereby allowing radial movement of said blow mandril relative to said blow mandril carrier.

4. The sizing device of claim 1 further comprising:
   hydraulic collet defining a collet pressure chamber and a collet clamping section, said collet being sized such tat the collet clamping section is capable of engaging said blow mandril to hinder axial movement;
   whereby a pressure medium introduced into said collet pressure chamber is capable of controlling said blow mandril's axial movement within said blow mandril carrier.

5. The sizing device of claim 1 further comprising:
   a biasing means positioned to axially bias said blow mandril in a direction towards said blow nozzle in a home position.

6. The sizing device of claim 5 further comprising:
   a first abutment and a second abutment, said first abutment being capable of blocking further axial movement in the home direction once said blow mandril has reached the home position, and said second abutment being capable of blocking further axial movement in the end direction once the blow mandril has reached the end position.

7. The sizing device of claim 3 further comprising:
   a annular guide sleeve disposed within said aperture of said blow mandril carrier and disposed around at least a portion of said blow mandril;
   an annular flange formed on said guide sleeve;
   a shoulder formed on the blow mandril carrier,
   an annular piston capable of axial movement disposed between said flange and said shoulder; and
   wherein said piston and said blow mandril carrier define said pressure chamber.

8. The sizing device of claim 7 further comprising:
   a compression spring disposed within an annular space defined by said guide sleeve and said annular piston for axially biasing said blow mandril in a home position.

9. The sizing device of claim 8 wherein said blow mandril further comprises a collar in contact with said compression spring.

10. The sizing device of claim 4 further comprising a guide sleeve having a section having an increased internal diameter defining an annular space for accepting said clamping section of said hydraulic collet.

11. The sizing device of claim 1 further comprising:
    a second setting means also actuatable by a pressure means for controlling said blow mandril's axial movement.

12. The sizing device of claim 11 wherein said second setting means comprises:
    a spring cable of locking said blow mandril in an adjusted axially position until said pressure medium is introduced into said pressure chamber, whereby introduction of said pressure medium compresses said spring and allows said blow mandril to move axially.

13. The string device of claim 1 when said blow mandril further comprises a blow and sizing part ad a mandril shank.

14. The sizing device of claim 1 further comprising:
    a clamping element capable of exerting a radially inward clamping face onto the blow mandril and actuated into a locking position by spring force and into an unlocking position by expansion from said pressure chamber.

15. The sizing device of claim 1 further comprising:
    a plurality of blow mandrils each having a blow nozzle and a cutting edge, each of said blow mandrils having a setting means for controlling radial and axial movement,
    wherein all of said setting means are actuated at the same moment as a joint unit.

16. The sizing device of claim 15 further comprising:
    a plurality of guide sleeves, wherein each blow mandril extends through an associated guide sleeve.

17. The sizing device of claim 1 further comprising: a guide sleeve, having a collet-like region and at least one clamping element adapted for exertion of radially inwardly directed clamping force, wherein said clamping element is urged into effective locking position by spring force and moveable into a release position by introduction of said pressure medium.

18. The sizing device of claim 17 wherein said collet-like region has at least one longitudinal slot and a conical external face surrounded by an annular piston having a complementary conical internal face, and whereby said piston forces said conical external face and said conical internal face into complementary engagement.

19. The sizing device of claim 1 further comprising:

a guide sleeve having a guide section having an internal face in contact with said blow mandril and having a clamping element;

a hood-like section surrounding the guide section and defining an annular chamber between said hood-like section and said guide section; and an annular piston disposed within said annular chamber.

20. The sizing device of claim 19 further comprising:

an annular shoulder;

an annular end face; and a seal associated with said piston;

said piston being sealingly disposed between said shoulder and said end face.

21. The sizing device of claim 20 further comprising;

a compression spring disposed between the annular piston and the hood-like section, whereby said spring urges the annular piston into the locked piston.

22. The sizing device of claim 21 wherein said spring is a belleville washer.

23. The sizing device of claim 6, further comprising a plurality of blow mandrils, each of said blow mandrils forming part of an associated module disposed within said module carrier, wherein the distance between the home position of each blow mandril and the end position are such that the distance exceeds the maximum distance in an axis-parallel direction of cutting edge positions when the blow mandrils are in the home position.

* * * * *